(12) United States Patent
Moldovan (10) Patent No.: US 9,024,185 B2
(45) Date of Patent: May 5, 2015

(54) ELECTRICAL BOX WITH CONVERTIBLE COMPONENT

(71) Applicant: Corneliu Moldovan, Rivervale, NJ (US)

(72) Inventor: Corneliu Moldovan, Rivervale, NJ (US)

(*) Notice: Subject to any disclaimer, the term of this patent is extended or adjusted under 35 U.S.C. 154(b) by 0 days.

(21) Appl. No.: 13/787,691

(22) Filed: Mar. 6, 2013

(65) Prior Publication Data

US 2013/0299208 A1  Nov. 14, 2013

Related U.S. Application Data

(60) Provisional application No. 61/646,687, filed on May 14, 2012.

(51) Int. Cl.
*H01R 4/00* (2006.01)
*H05K 5/02* (2006.01)
*H02G 3/08* (2006.01)

(52) U.S. Cl.
CPC . *H05K 5/02* (2013.01); *H02G 3/086* (2013.01)

(58) Field of Classification Search
USPC .................................................. 175/50, 58
See application file for complete search history.

(56) References Cited

U.S. PATENT DOCUMENTS

| 1,929,844 | A | * | 10/1933 | Haas | 220/529 |
| 5,594,207 | A | * | 1/1997 | Fabian et al. | 174/58 |
| 6,576,835 | B1 | * | 6/2003 | Ford et al. | 174/50 |
| 6,903,272 | B2 | * | 6/2005 | Dinh | 174/58 |

* cited by examiner

*Primary Examiner* — Jenny L Wagner
*Assistant Examiner* — Michael E Moats, Jr.
(74) *Attorney, Agent, or Firm* — Bakos & Kritzer (57) ABSTRACT

An electrical box with a removable wall is disclosed. The removable wall comprises pre-designated areas that may be detached or bent, thereby converting the wall into a partition. The resulting partition may be used as a shield barrier between two compartments in a multi-gang box.

12 Claims, 8 Drawing Sheets

ELECTRICAL BOX WITH CONVERTIBLE COMPONENT

BACKGROUND

Electrical boxes are used to house wiring and devices in residential, commercial and industrial buildings. For example, an electrical box may be used to house electrical outlets, light switches, or wiring for appliances such as ceiling fans. An electrical box is typically mounted on a wall stud but may be mounted on drywall or plaster. Typically, a single electrical box contains screw holes and/or mounting brackets for mounting the box to a stud. The front of the electrical box is open to allow an outlet, switch, or face plate to be mounted. The top, bottom, back and/or side walls of the electrical box may contain one or more "knockout sections". The knockout sections are pre-designated areas of a wall that are structurally formed so as to be bent inward, bent outward or removed by an electrician to allow the electrician to run wires through the wall into and out of the box. Electrical boxes are generally fabricated using various materials including metal and plastic. While different materials have advantages and disadvantages, the principles of the present disclosure apply to constructions of any material.

A typical electrical box may have a volume of 10-20 cubic inches. In applications where additional space is needed or less space is available, a larger or smaller electrical box may be used as appropriate. A gangable box, which may be referred to as a "gang box", is an electrical box with one or more removable sides, allowing two or more boxes to be joined together. Accordingly, a double gang box is formed by joining two gang boxes together and typically has dimensions approximately twice that of a single gang box. Likewise, a triple gang box is formed by joining three gang boxes together and typically has dimensions approximately three times that of a single gang box. Multi-gang boxes offer additional space to house wiring and can mount a corresponding number of outlets, receptacles, wall plates, face plates, outlet covers, wall covers, socket covers or other items. Multi-gang boxes may be prefabricated or may be assembled by an electrician by ganging together two or more gang boxes.

To comply with building codes and regulations, a gangable electrical box may not house wires carrying more than one voltage or cumulate more than 300 volts in the same enclosure unless properly separated. For example, a set of wires carrying 120 volts may not be housed in the same electrical box as a set of wires carrying 277 volts. As a result, an electrical box may not house both a standard electrical outlet in the United States (carrying 120 volts) with an electrical switch carrying 277 volts. Likewise, an outlet designed for a "low voltage" consumer device, for example an outlet housing a telephone or ethernet cable, may not be housed in the same electrical box as an electrical outlet designed for a "high voltage" device such as a toaster. As another example, a standard electrical outlet in the United States carrying 120 volts should not be housed in the same electrical box as a coaxial cable for television service.

For an electrical box with more than one voltage or more than 300 volts total to comply with building codes and regulations, an appropriate shield barrier must be present within the electrical box, separating the different voltages. In order for electricians to comply with the building codes and regulations, prefabricated multi-gang electrical boxes with appropriate shield barriers are commercially available. These prefabricated multi-gang boxes are sold with a shield barrier pre-installed in between each compartment. Another commercially available solution is a separately installable gang box divider which is produced and sold separately, and is designed to slide into slots in the interior wall of a gang box.

Existing solutions, such as the ones described above, require an electrician to maintain an inventory of electrical boxes of varying sizes. Alternatively, an electrician may maintain an inventory of gang boxes of varying sizes along with a separate supply of shield barriers. There exists a need for a solution that reduces the number of parts that an electrician must carry in inventory. There also exists a need for a solution that simplifies the process implemented by an electrician in order to provide a multi-gang box housing separate voltages. There also exists a need for a solution that provides multiple uses for components of a single electrical box. The solutions currently existing in the art fail to offer a gang box with a wall that may be removed and modified for use as a shield barrier.

SUMMARY

In view of the foregoing disadvantages inherent in the art, and in accordance with a first preferred embodiment of the present invention, disclosed is a gang box with a wall that may be modified for use as a shield barrier. Specifically, disclosed is an electrical box comprising a first housing comprising a top plate, a back plate and a bottom plate, and a first wall plate comprising one or more removable areas wherein the first wall plate is configured to be mounted as a partition between the first housing and a second housing when the removable areas are detached.

In one embodiment, a single gang box is provided with a removable wall. Certain sections of the wall may be removed or bent, thereby converting the wall into a partition for use in a multi-gang box.

In an example applying this principle, two single gang boxes may be attached to form a two-gang box with a partition. Specifically, a wall from one of the single gang boxes may be removed and converted into a partition. Next, a wall from the remaining single gang box is removed. Finally, the two gang boxes are combined with the partition inserted between them. The resulting product is a two-gang electrical box with a shield barrier.

In another embodiment, a convertible wall may be provided separately. The wall may be attached as-is to the side of a gang box. Alternatively, the removable sections of the wall may be removed or bent to form a partition, and the partition may be inserted into a multi-gang box to serve as a shield barrier.

Other objects, features, and characteristics of the present invention, as well as methods of operation and functions of the related elements of the structure, and the combination of parts, will become more apparent upon consideration of the following detailed description with reference to the accompanying drawings, all of which form part of this specification.

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

None of the terms used herein, including "top", "bottom" and "side" are meant to limit the application of the invention. Any reference to an "electrician" is exemplary and is intended to encompass any person. The terms are used to illustrate the preferred embodiment and are not intended to limit the scope of the invention. Similarly, the use of these terms is not meant to limit the scope or application of the invention, as the invention is versatile and can be utilized in many applications, as will be apparent. The following presents a detailed description of the preferred embodiment of the present invention with reference to the figures.

Figure 1:
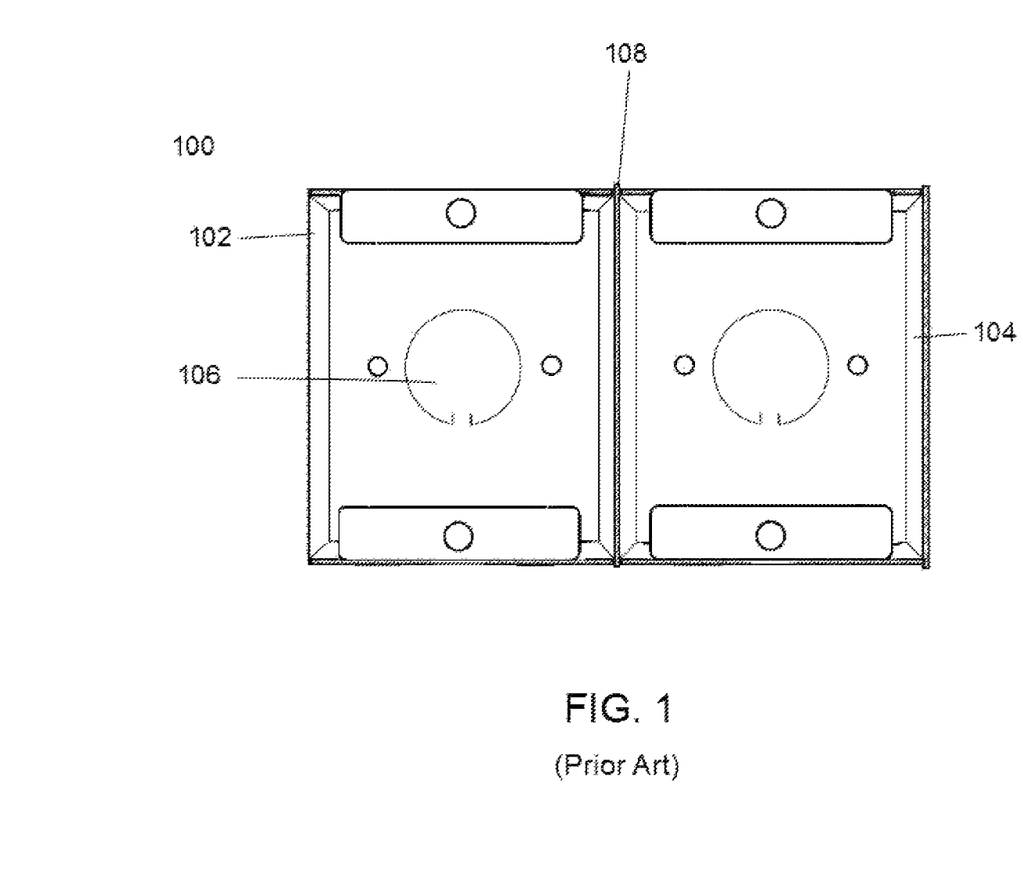
FIG. 1 illustrates a prior art gangable masonry box with a partition.

Referring to FIG. 1, disclosed is a prior art gangable masonry box 100 comprising compartment 102 and compartment 104 separated by a partition 108. Gangable masonry box 100 also comprises knockout 106, which can be bent or removed to create a hole for connectors. Knockout 106 is formed by perforating, stamping, partially cutting or otherwise weakening the circular outline, allowing an electrician to push the area of knockout 106 and bend it or remove it from the rear wall of gangable masonry box 100. Wire, cable, tubing or other similar conduit can then be run through the resulting hole into or out of gangable masonry box 100 using a connector.

Figure 2:
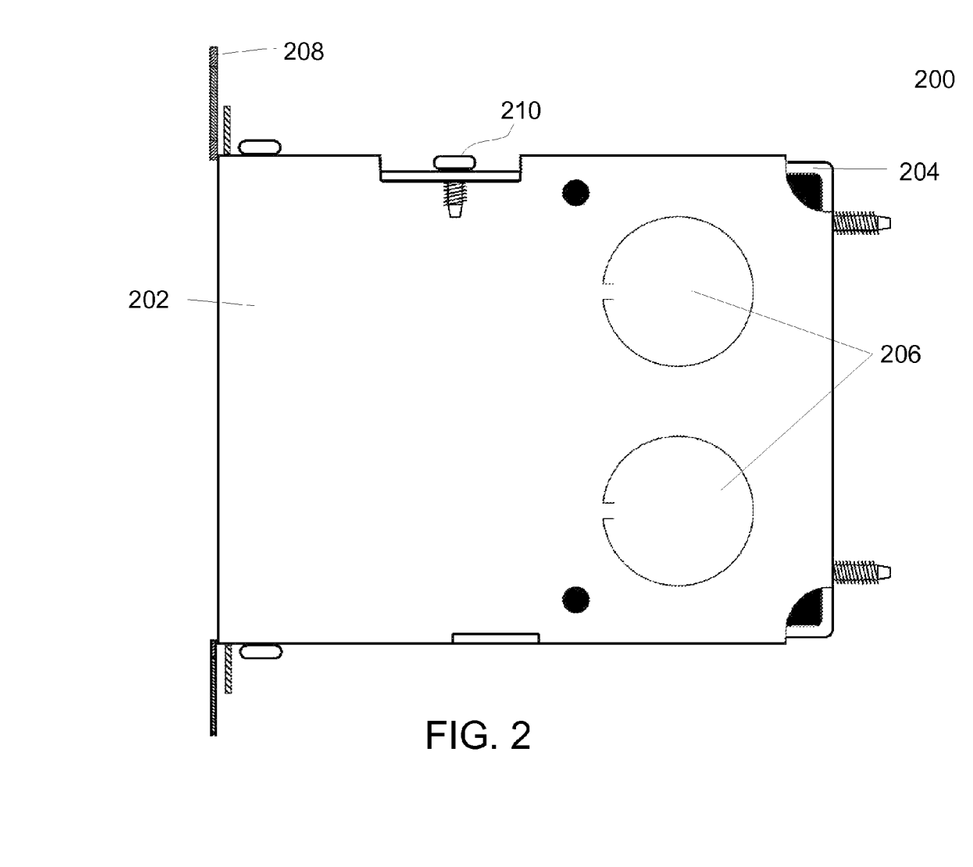
FIG. 2 illustrates the side view of a gang box in accordance with an embodiment of the present invention.

FIG. 2 depicts a side view of a gang box in accordance with an embodiment of the present invention. Wall 202 is designed to enclose the side of gang box 200 and is fastened to body 204 by screw 210, though any known means for attaching wall 202 is contemplated for use with the present invention. Wall 202 contains knockouts 206 designed to be bent, cut or removed from wall 202 in order to create a hole for connectors. Mount 208 may be used as a stopper to prevent the box from falling behind the drywall or other surface on which the box is mounted.

Figure 3A:
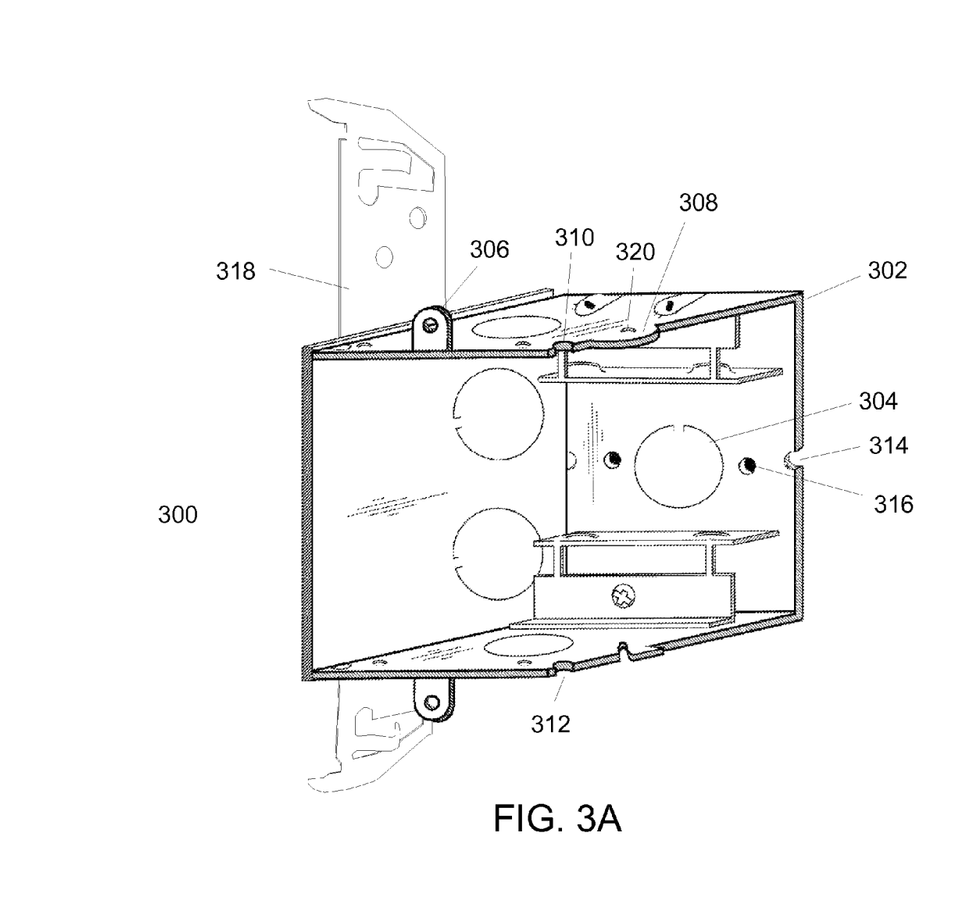
FIG. 3A illustrates a perspective view of a gang box with one wall removed in accordance with an embodiment of the present invention.
Figure 3B:
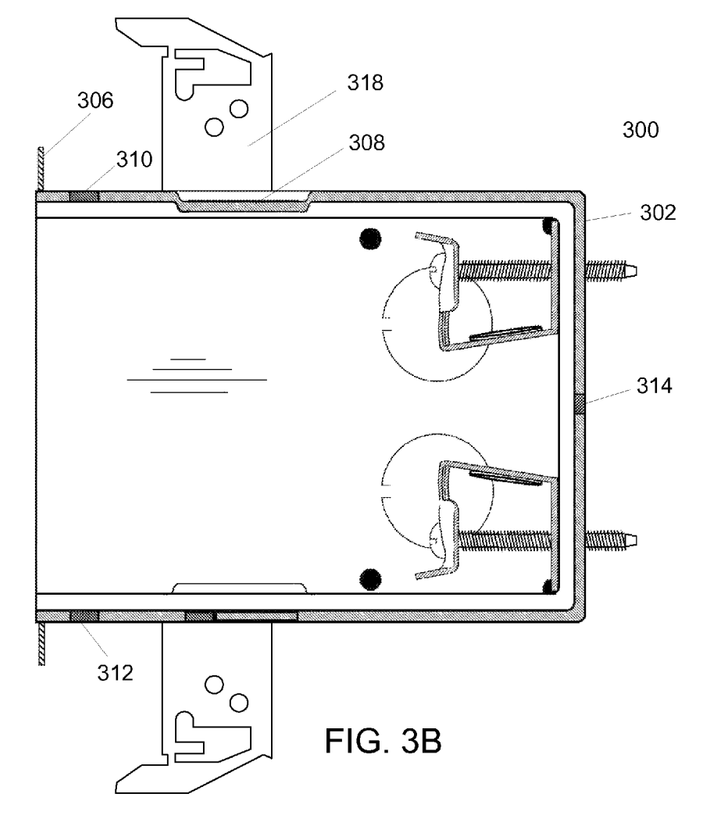
FIG. 3B illustrates a side view of the gang box depicted in FIG. 3A.

Referring to FIG. 3A, shown is a perspective view of a gang box with a wall removed in accordance with an embodiment of the present invention. Gang box 300 comprises body 302, knockout 304, mount 306, indents 310, 312 and 314, and protrusion 308. Protrusion 308 comprises a hole 320 that may be used to attach a wall or additional gang box to gang box 300 using a screw, nail or other suitable connection. Hole 316 may be used to screw, nail or otherwise affix the body 302 to a wall or other structure. Wall bracket 318 may be used to screw, nail or otherwise affix the body 302 to a wall stud or other solid surface. It should be apparent that either a wall mount or a stopper may be used, and either may be present or omitted as desired. FIG. 3B depicts a side view of gang box 300. Shown is body 302, mount 306, protrusion 308, indents 310, 312 and 314, and wall bracket 318.

Figure 4A:
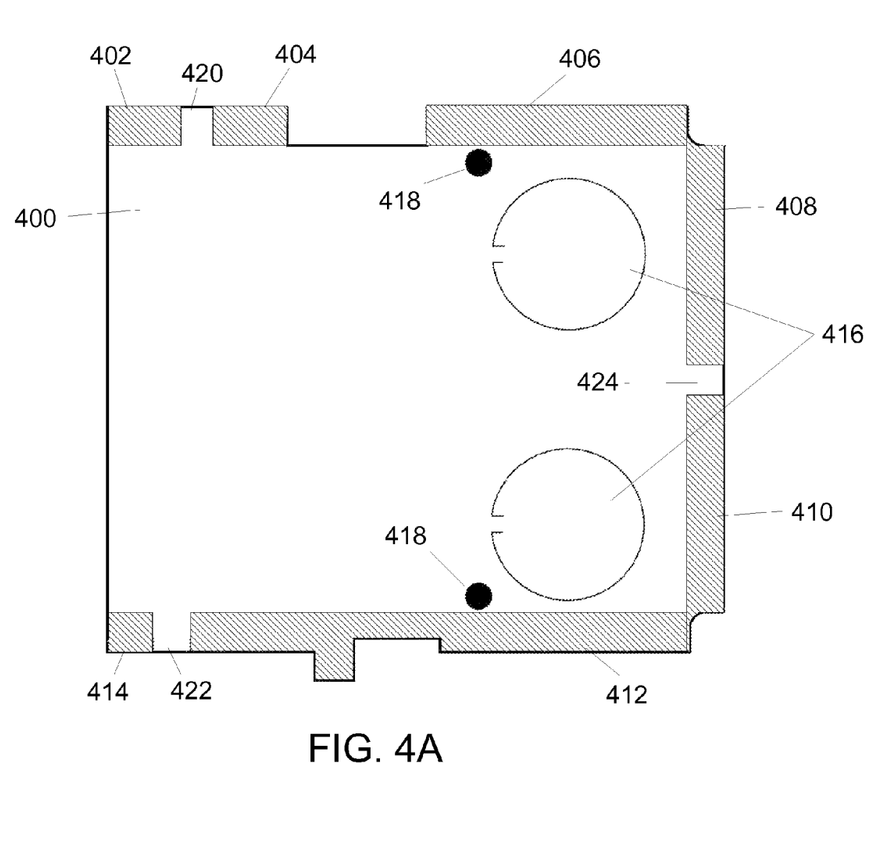
FIG. 4A illustrates a wall plate in accordance with an embodiment of the present invention.
Figure 4B:
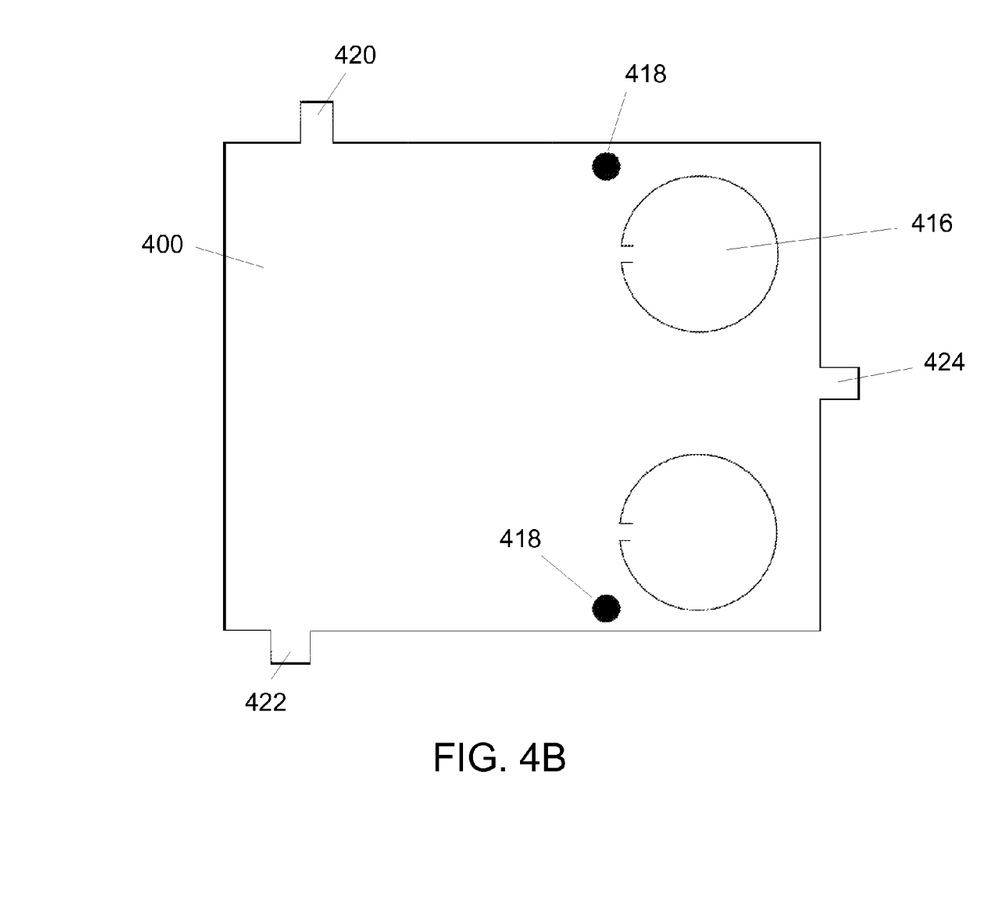
FIG. 4B illustrates the wall plate of FIG. 4B with removable portions detached.

FIG. 4A depicts a wall 400, which comprises knockouts 416, holes 418, protrusions 420, 422 and 424, and removable portions 402, 404, 406, 408, 410, 412 and 414. A removable portion may be formed by perforating, stamping, partially cutting or otherwise weakening the shaded area, or the perimeter of the shaded area, so that it may be detached by a person. To detach a removable portion, the piece may be bent or folded over until the removable portion breaks away from the rest of the wall. FIG. 4B depicts wall 400 with all removable portions detached from the wall. Protrusions 420, 422 and 424 remain after the removable portions have been detached, and can be used to secure wall 400 within a gang box, as shown below. In an alternative embodiment, one or more of the removable portions may be bent, folded or otherwise moved in such a way as to not obstruct the goals of the present invention. Once the removable portions have been detached or otherwise moved, wall 400 can function as a partition within a gang box. Thus, wall 400 has been converted from a wall attachable to the exterior of a gang box into a partition that may be affixed inside the interior of a gang box.

Figure 5A:
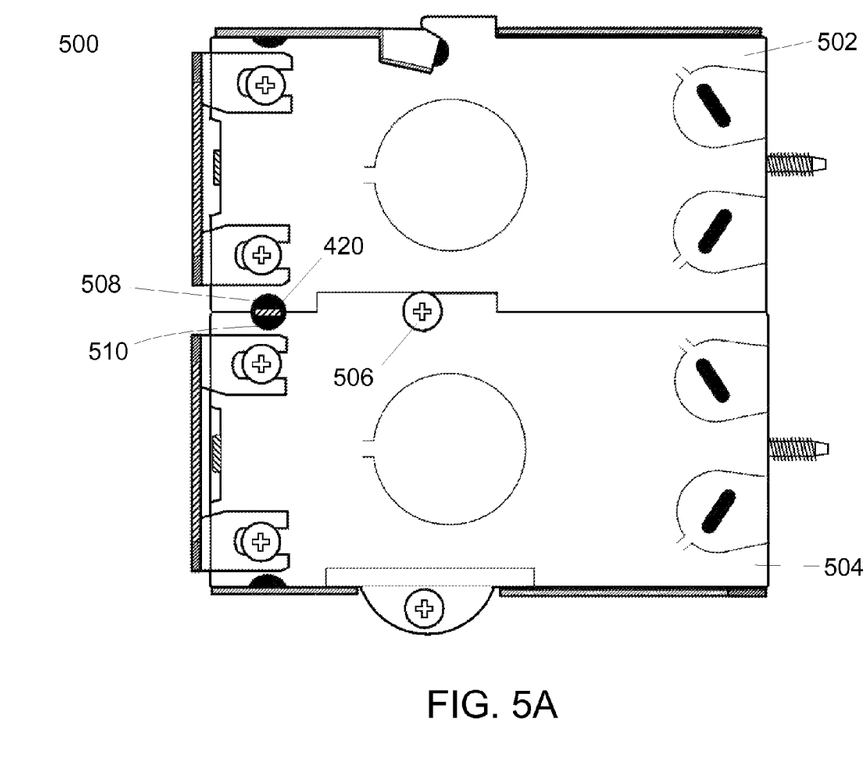
FIG. 5A illustrates a top view of a double gang box comprising a partition in accordance with an embodiment of the present invention.

FIG. 5A depicts a top view of a double gang box 500 containing a partition in accordance with an embodiment of the present invention. Gang box 502 and gang box 504 are joined by screw 506 and an optional second screw 512 (not shown) disposed in the bottom of the double gang box. Mounted between gang boxes 502 and 504 is wall 400 with all removable portions detached. Protrusion 420 can be seen protruding through a gap formed by indents 508 and 510. Protrusions 420, 422 (not shown and 424 (not shown) fit into gaps in the body of double gang box 500, such as the gap formed by indents 508 and 510. In this manner, protrusions 420, 422 and 424 are able to secure wall 400 within the interior of double gang box 500.

It should be appreciated that protrusions such as protrusion 420 and indents such as indents 508 and 510 are preferred and not required. Protrusions and indents may be used to align and secure a partition between gang boxes.

Figure 5B:
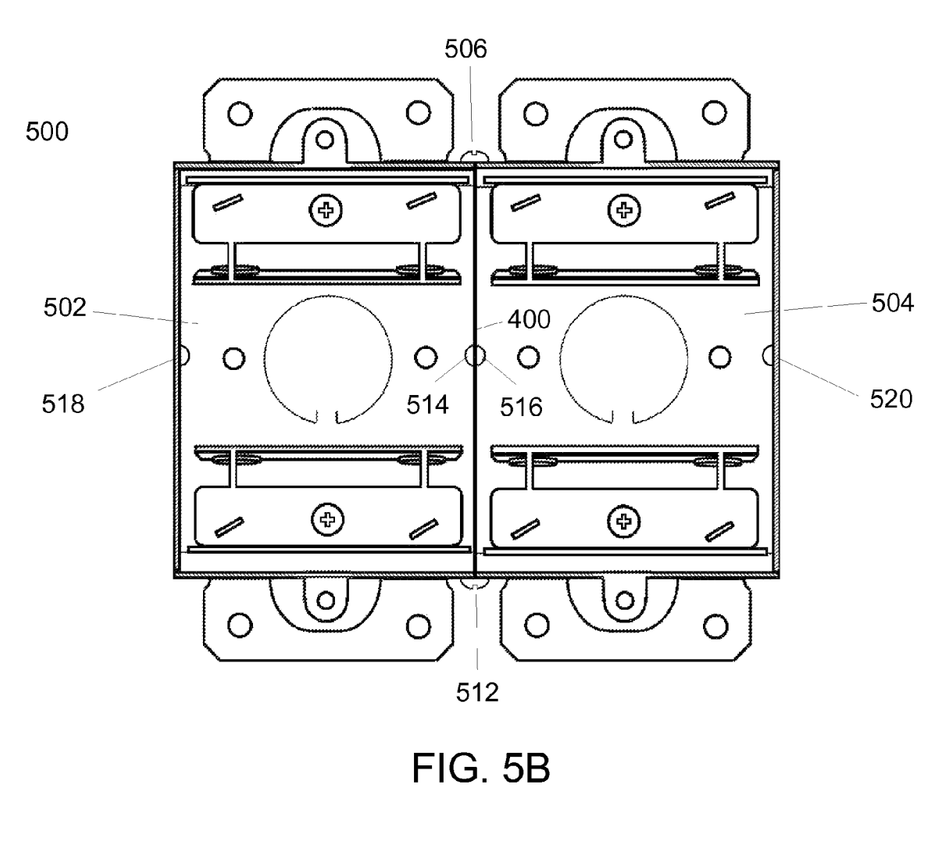
FIG. 5B illustrates a front view of the double gang box and partition depicted in FIG. 5A.

FIG. 5B depicts a front view of double gang box 500. Wall 400 is mounted between gang boxes 502 and 504 and serves as a shield barrier, allowing an electrician to house, for example, more than one voltage in double gang box 500. Indent 514 in gang box 502 and indent 516 in gang box 504 together form a hole which may accept a rear protrusion (not shown) of wall 400. Screws 506 and 512 are used to secure gang boxes 502 and 504 together. It should be noted that indents 518 and/or 520 may be used in conjunction with additional gang boxes (not present) to form holes that accept rear protrusions of additional walls (not present). It should also be noted that screws 506 and 512 are preferred, but either or both may be omitted or replaced by another suitable means for attaching boxes 502 and 504.

The disclosed embodiments allow an electrician or other person to detach a wall from a single gangable box, detach or fold back pre-specified portions of the wall, and use the resulting wall as a partition between two gang boxes. In other words, a wall can be converted into a partition on site. The disclosed gang boxes and walls allow multiple gang boxes to be ganged together, either with or without partitions. Thus, with the disclosed gang boxes and walls, an electrician only needs to stock single gang boxes. The electrician does not need to separately stock pre-fabricated partitions, because the wall of a gang box of the disclosed embodiments can be converted into a partition on site. It should be appreciated that the disclosed embodiments can be applied to old work boxes and new work boxes. It should be appreciated that the disclosed embodiments can be applied to electrical boxes and masonry boxes.

It should be appreciated that the convertible wall disclosed herein may be sold or delivered independently of a gang box. The wall may be attached to a gang box to serve as an exterior wall, or may be converted to a partition and affixed between two gang boxes. It should be appreciated that the shape and dimensions of the gang boxes, walls, partitions and other components may be varied without departing from the spirit and scope of the disclosure. For example, a gang box may be square, rectangular or another shape, a partition may have straight or rounded corners, and screw holes and mounts may be placed on the front, side, top, bottom or rear of the box.

While the present invention has been described with reference to the preferred embodiment, which has been set forth in considerable detail for the purposes of making a complete disclosure of the invention, the preferred embodiment is merely exemplary and is not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An electrical box, comprising:
   a first housing comprising a top plate, a back plate and a bottom plate;
   a first outermost wall plate, the first outermost wall plate comprising one or more removable areas; and
   wherein the first outermost wall plate is configured to be mounted as a partition between the first housing and a second housing when the removable areas are detached.

2. The electrical box of claim 1, wherein the removable areas are defined by stamped lines.

3. The electrical box of claim 1, wherein the removable areas are defined by perforated lines.

4. The electrical box of claim 1, wherein the removable areas are defined by partially cuts.

5. The electrical box of claim 1, wherein at least one of the first housing, the first outermost wall plate, the second wall plate and the second housing comprises one or more knockouts.

6. The electrical box of claim 1, wherein the first housing comprises one or more wall mounts.

7. The electrical box of claim 1, wherein the first housing comprises one or more screw holes.

8. The electrical box of claim 1, wherein the first housing comprises one or more screws for affixing the first outermost wall plate to the first housing.

9. The electrical box of claim 1, wherein the first housing comprises one or more indents.

10. The electrical box of claim 9, wherein the one or more indents are adapted to receive one or more protrusions of the first outermost wall plate.

11. The electrical box of claim 1, wherein one or more of the first housing, second housing, first outermost wall plate comprise metal.

12. The electrical box of claim 1, wherein one or more of the first housing, second housing, first outermost wall plate comprise plastic.

* * * * *